Dec. 22, 1942. H. W. GOYINGS 2,305,865
ARTIFICIAL FISH BAIT
Filed Feb. 24, 1941
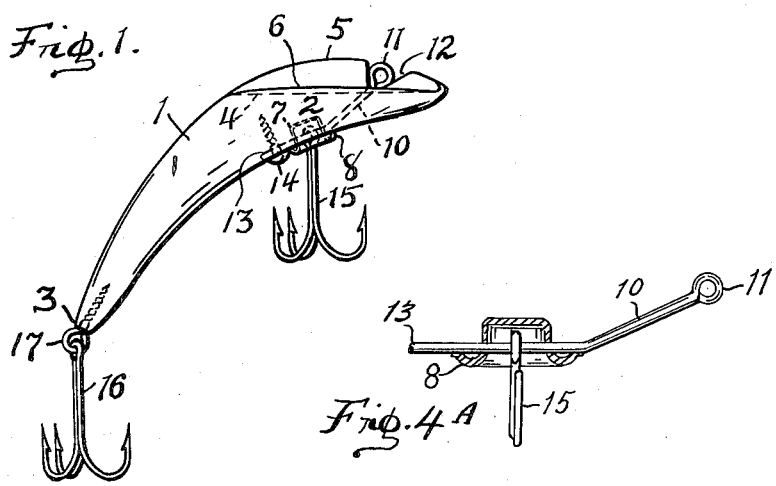
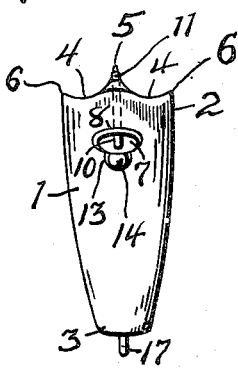
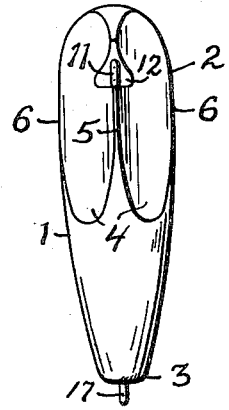
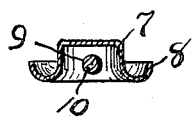
Homer W. Goyings INVENTOR.
BY
A. G. Burns ATTORNEY Patented Dec. 22, 1942

2,305,865

UNITED STATES PATENT OFFICE 2,305,865

ARTIFICIAL FISH BAIT

Homer W. Goyings, Hicksville, Ohio, assignor to John Ray Schilb, Hicksville, Ohio Application February 24, 1941, Serial No. 380,225

4 Claims. (Cl. 43—46)

This invention relates to improvements in artificial fish bait of that type having a body from which hooks are suspended loosely so as to have limited swinging movement relative to the body. Generally, lures of this type when drawn through the water are intended to travel through a zig-zag course and in some instances actually do to an extent and thus traverse a broad path through the water. In the present instance, however, and it is an object of the invention, to so form the body of the bait that when drawn through the water it will follow the line by which it is drawn directly in a straight path instead of a zig-zag course, and while traveling in a straight course at the ordinary speed of a live swimming fish manifests animation particularly of its tail portion. Such wavering tail movement more closely simulates the behavior of a lively swimming fish and attracts the quarry to a greater extent than the ordinary bait that follows a zig-zag course without such wavering tail action.

Another object of the invention is to provide an improved fixture for attaching the major hook to the body and which also serves as a member for the attachment of a fish line to a bait.

Other objects and advantages of the invention appear in the following description.

An illustrative embodiment of the invention is shown in the accompanying drawing, in which:

Fig. 1 is a side elevational view of a structure in which the invention is incorporated;

Fig. 2 is a front elevational view of the bait body with the hooks omitted, the view being at right angles to that of Fig. 1;

Fig. 3 is a top plan view of the body;

Fig. 4 is a transverse sectional view of one of the hook-securing fixtures;

Fig. 4A is another sectional view of one of the hook-securing fixtures in a plane at right angles to that of Fig. 4; and Fig. 5 is a similar view of a modified form of the fixture, Figs. 4, 4A and 5 being drawn to an enlarged scale.

The illustrative embodiment of the invention consists of a body 1 formed of any suitable materials, such as wood, shaped in a particular fashion so as to have a convexo-concavo tapering form, the body being longitudinally arcuate, thickest through its head portion 2 and tapering therefrom more or less uniformly to its tail end 3. The top of the head portion 2 has made therein longitudinal parallel flutes 4 slightly spaced apart from each other, there being between said flutes an upstanding ridge 5 that extends longitudinally between the flutes to the front end of the body and is located midway between the opposite sides of the head. The flutes are of uniform depth and conform throughout their length to definite radii from corresponding parallel axes and extend laterally from the ridge to the corresponding outer edges of the head. The flutes are of such size and depth as to leave slight upwardly extending flanges 6 along the sides of the head.

In the bottom of the body adjacent the head 2 is imbedded a socket 7 preferably formed of thin metal and shaped to have a rounded external flange 8 at its outer end that underlies the adjacent face of the body when the socket is in place. The sleeve portion of the socket has made in its opposite walls alined openings 9 for the reception therethrough of a link 10 that extends diagonally downward through the head. The forward of the link has an eye 11 located in a notch 12 made in the ridge 5 at a suitable distance spaced from the front end of the head, and the rear end of the link has an eye 13 that is secured to the body by a screw 14.

A major fish hook 15, preferably of the treble type, is secured loosely upon the link 10 within the socket 7 so as to have swinging movement limited by the flange 8 to prevent the points of the hook from having contact with the body. A trailing hook 16 of similar character is attached to the tail end 3 of the body, preferably by means of a screw eye 17, the connection of the hook with the screw eye being loose so as to permit wavering action of the tail of the body.

In Fig. 5 is shown a socket 7' of modified form. In this instance instead of the openings 9 as shown in Fig. 4 for the accommodation of the link, there is made in the outer end of the socket and its flange 8' an indenture 9' in which the link 10 is positioned when secured to the body. This arrangement to an extent facilitates assemblage of the body and the hook securing fixture and functions in substantially the same manner as in the former instance.

In use, the bait is attached to a fish line (not shown) by connecting the line through the eye 11 and is then cast into the water and trolled in the usual manner, whereupon, due to the resistance of the water traversed, the tail of the body rises and the front end of the head is diverted downwardly. The longitudinal ridge 5 follows directly the draft of the line and restrains lateral movement of the head, while the arcuate tapering convexo-concave tail, unresisted except for the weak hindrance of the loosely attached trailer hook, is left substantially free to flutter about, which action is accentuated by water pressure against the concavo bottom of the body and deflection of the encountered water through the flutes which causes eddies that more or less disturb the tail end of the body during its travel through the water.

When the bait is drawn through the water at the ordinary speed of a live swimming fish maneuvering about, the tail end of the body is caused to flutter with more or less vigor as the speed of its travel is varied. In this manner is very closely simulated the animations of an active natural fish.

Variations from the particular construction above disclosed may be resorted to by the exercise of skill in the art, without departure from the spirit or scope of the invention, and the following claims are intended to be inclusive of such variations.

What I claim is:

1. An artificial fish bait of the type having a body and hooks loosely suspended therefrom, a bait body to which hooks are loosely suspended, said body having an arcuate convexo-concave form, widest in the head portion and tapering therefrom toward the tail end, said head portion having longitudinal parallel flutes spaced apart and an intervening upwardly projecting ridge, a fixture located in the head portion having an eye at its front end disposed in a notch in said ridge for the attachment of a fish line and having a major hook member supported thereby at its rear end, and a trailer hook connected to the tail end of said body.

2. In an artificial fish bait, a body having an arcuate convexo-concave form, thickest in the head portion and tapering therefrom toward the tail end, said head portion having in its top longitudinal parallel flutes of uniform depth and an upwardly projecting longitudinal ridge intervening therebetween and marginal upwardly extending flanges along its sides, a major hook connected to the body beneath the head portion having limited swinging movement, and a trailer hook connected with the rear end of the body.

3. In an artificial fish bait, a body having an arcuate convexo-concave form, thickest in the head portion and tapering therefrom toward the tail end, said head portion having an upwardly projecting longitudinal ridge that terminates at its juncture with the tapering portion, and marginal upwardly extending flanges along its sides to resist lateral movement thereof, and hook members secured to the body having swinging movement relative thereto.

4. An artificial fish bait constituted of a body and hook members loosely suspended therefrom, said body having an arcuate convexo-concave rearwardly tapering form and provided with an upwardly projecting longitudinal ridge extending throughout the length of its head portion wherefore to resist lateral movement of said head portion in the water, when the bait is trolled therein, and permit lateral fluttering action of the tail portion of said body.

HOMER W. GOYINGS.